(12) United States Patent
Ghaemi

(10) Patent No.: US 9,547,646 B2
(45) Date of Patent: Jan. 17, 2017

(54) USER-CREATED MEMBERS POSITIONING FOR OLAP DATABASES

(71) Applicant: Houman Ghaemi, Vancouver (CA)

(72) Inventor: Houman Ghaemi, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 249 days.

(21) Appl. No.: 14/281,622

(22) Filed: May 19, 2014

(65) Prior Publication Data

US 2015/0331928 A1    Nov. 19, 2015

(51) Int. Cl.
*G06F 17/30*         (2006.01)
(52) U.S. Cl.
CPC .......... *G06F 17/30* (2013.01); *G06F 17/3053* (2013.01); *G06F 17/30563* (2013.01); *G06F 17/30589* (2013.01); *G06F 17/30592* (2013.01)
(58) Field of Classification Search
CPC ................ G06F 17/30592; G06F 9/466; G06F 17/30589; G06F 17/30563; G06F 17/3053
USPC .................................................. 707/602, 607
See application file for complete search history.

(56) References Cited

U.S. PATENT DOCUMENTS

| | | | |
|---|---|---|---|
| 6,651,055 B1 | 11/2003 | Kilmer et al. | |
| 8,255,368 B2 | 8/2012 | Cox | |
| 8,359,305 B1* | 1/2013 | Burke et al. | 707/706 |
| 8,468,177 B2* | 6/2013 | Reeves et al. | 707/802 |
| 2005/0165733 A1 | 7/2005 | Strovink | |
| 2007/0130116 A1 | 6/2007 | Cras et al. | |

FOREIGN PATENT DOCUMENTS

WO    WO 03/012698    2/2003

OTHER PUBLICATIONS

Arie Shoshani, OLAP and Statistical Databases: Similarities and Differences, 1997, ACM, 185-196.*

* cited by examiner

*Primary Examiner* — Jean B Fleurantin
(74) *Attorney, Agent, or Firm* — Fish & Richardson P.C.

(57) ABSTRACT

The present disclosure describes methods, systems, and computer program products for positioning user-created data in an Online Analytical Processing (OLAP) database. A method may comprise receiving, at a server and from a client computing device, a query specifying one or more anchor members in a first hierarchy of the database and one or more user-created members to be positioned in the first hierarchy in relation to the anchor members according to a user-specified order, the first hierarchy of the database including members arranged in positions specified by the server; positioning, by the server, the user-created members in the first hierarchy of the database in relation to the anchor members according to the user-specified order, wherein the positioning comprises: determining a rank position for each of the anchor members; creating, for each of the user-created members, an auxiliary calculated member on an ancillary hierarchy, the auxiliary calculated member indicating the respective user-created member and the rank position of the associated anchor member.

20 Claims, 10 Drawing Sheets

| Analysis 1 | |
|---|---|
| Customer Geography | Measures Internet Sales Amount |
| ⊟ All Customers | $ 29,358,677.22 |
| ⊞ Australia | $ 9,061,000.58 |
| ⊞ Canada | $ 1,977,844.86 |
| Australia + Canada | 11,038,845.45 |
| Australia + Canada Avg. | 5,519,422.72 |
| Australia - Canada | 7,083,155.72 |
| ⊞ France | $ 2,644,017.71 |
| ⊞ Germany | $ 2,894,312.34 |
| ⊞ United Kingdom | $ 3,391,712.21 |
| ⊞ United States | $ 9,389,789.51 |

FIG. 3A

| Analysis 1 | |
|---|---|
| Customer Geography | Measures <br> Internet Sales Amount |
| ⊟ All Customers | $ 29,358,677.22 |
| ⊞ Australia | $ 9,061,000.58 |
| ⊟ Canada | $ 1,977,844.86 |
| ⊞ Alberta | $ 22,467.80 |
| Alberta prediction | 33,701.70 |
| ⊞ British Columbia | $ 1,955,340.10 |
| British Columbia - Alberta | 1,932,872.30 |
| ⊞ Brunswick | |
| ⊞ Manitoba | |
| ⊞ Ontario | $ 36.96 |
| ⊞ Quebec | |
| Australia + Canada | 11,038,845.45 |
| Australia + Canada Avg. | 5,519,422.72 |
| Australia - Canada | 7,083,155.72 |
| ⊞ France | $ 2,644,017.71 |
| ⊞ Germany | $ 2,894,312.34 |
| ⊞ United Kingdom | $ 3,391,712.21 |
| ⊞ United States | $ 9,389,789.51 |

FIG. 3B

USER-CREATED MEMBERS POSITIONING FOR OLAP DATABASES

TECHNICAL FIELD

The present disclosure relates to software, computer systems, and computer-implemented methods for an improved positioning of user-created data members in OLAP databases. In particular, this disclosure relates to techniques for enabling users to create data sets for an OLAP hierarchy defined in MDX according to user-specified positions.

BACKGROUND OF THE DISCLOSURE

Business Intelligence (BI) generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources (e.g., machines), integration tools to analyze and generate workflows based on enterprise systems, database management systems to organize, store, retrieve and manage data in databases, such as relational, Online Transaction Processing (OLTP) and Online Analytic Processing (OLAP) databases, and performance management applications to provide business metrics, dashboards, and scorecards, as well as best-practice analysis techniques for gaining business insights.

OLAP data sources and tools are a subset of BI tools. OLAP tools are report generation tools and are otherwise suited to ad hoc analyses. OLAP generally refers to a technique of providing fast analysis of shared multidimensional information stored in a database. OLAP systems provide a multidimensional conceptual view of data, including full support for hierarchies and multiple hierarchies.

OLAP is typically implemented in a multi-user client/server mode to offer consistently rapid responses to queries. OLAP helps the user synthesize information through use of an OLAP server that is specifically designed to support and operate on multidimensional data sources. The querying process for OLAP can involve, depending on the specific implementation, writing and executing a query. Multidimensional Expressions ("MDX") is a query language for OLAP databases, like SQL is a query language for relational databases. Thus, an MDX statement can be used to query for a result from an OLAP data source, e.g., an OLAP data cube.

U.S. Pat. No. 8,255,368 B2 describes a computer readable storage medium comprising executable instructions to receive user-created data for user-specified positions in an OLAP hierarchy. The OLAP hierarchy is reorganized according to the user-created data. Data manipulation statements are generated to evaluate a set of members of the OLAP hierarchy according to the user-specified positions.

SUMMARY OF THE DISCLOSURE

The present disclosure describes computer-implemented methods, systems, and computer program products for providing users an interface to create data sets for an OLAP hierarchy defined in MDX according to user-specified positions.

One or more of the following aspects of this disclosure can be embodied alone or in combination as methods that include the corresponding operations. One or more of the following aspects of this disclosure can be implemented alone or in combination in a device comprising a processor, a processor-readable medium coupled to the processor having instructions stored thereon which, when executed by the processor, cause the processor to perform operations according to the one or more of the following aspects. One or more of the following aspects of this disclosure can be implemented alone or in combination on a computer program product encoded on tangible storage medium, the product comprising computer readable instructions for causing one or more computers to perform the operations according to the one or more of the following aspects.

In a general aspect 1, a computer-implemented method for positioning user-created data in an Online Analytical Processing (OLAP) database comprises: receiving, at a server and from a client computing device, a query specifying one or more anchor members in a first hierarchy of the database and one or more user-created members to be positioned in the first hierarchy in relation to the anchor members according to a user-specified order, the first hierarchy of the database including members arranged in positions specified by the server; positioning, by the server, the user-created members in the first hierarchy of the database in relation to the anchor members according to the user-specified order, wherein the positioning comprises: determining a rank position for each of the anchor members; creating, for each of the user-created members, an auxiliary calculated member on an ancillary hierarchy, the auxiliary calculated member indicating the respective user-created member and the rank position of the associated anchor member; generating one or more query expressions in a query language of the database, the expressions specifying the anchor members and the one or more auxiliary calculated members; and executing the query expressions; and outputting, by the server to the client device, the first hierarchy of the database including the user-created members according to the user-specified order.

Aspect 2 according to aspect 1, wherein each user-created member is a data structure that contains information about at least one of: a definition of the user-defined members as one or more OLAP language expressions, an identifier for the user-created members, an identifier for the anchor member, or an identifier for a parent of each user-created member.

Aspect 3 according to aspect 1 or 2, wherein the anchor member is a native member of the first hierarchy or another user-created member on the first hierarchy included in the query.

Aspect 4 according to any one of aspects 1 to 3, further comprising: determining, at the server, the ancillary hierarchy in a pre-processing operation after the receiving of the query from the client computing device, wherein the ancillary hierarchy is mathematically orthogonal to the first hierarchy.

Aspect 5 according to any one of aspects 1 to 4, wherein the one or more user-created members are positioned after their associated anchor member and not before their associated anchor member.

Aspect 6 according to any one of aspects 1 to 5, wherein the created query expressions include sorting of the auxiliary calculated members according to the ranks of the anchor members.

Aspect 7 according to any one of aspects 1 to 6, wherein positioning of the user-created members does not require prescience of the state of the anchor member within the result of the query before execution of the axes query expressions.

Aspect 8 according to any one of aspects 1 to 7, wherein the positioning further comprises: positioning the user-created members that are anchored to the same anchor member in the same order that they appear in the query.

Aspect 9 according to any one of aspects 1 to 8, wherein the user-specified order specifies for each user-created member, before or after of which other member the user-created member is to be positioned, wherein the user-specified order differs from positions that would have been specified by the server absent the user-specified order.

Aspect 10 according to any one of aspects 1 to 9, wherein the query language is Multidimensional Expressions (MDX).

Aspect 11 according to any one of aspects 1 to 10, wherein the method is performed without creating or sorting "calculation chains", or wherein the method is performed regardless of the state of the anchor members within the results of query execution as to the presence, or absence, of the anchor members.

Aspect 12 according to any one of aspects 1 to 11, wherein the query further specifying one or more query expressions for each hierarchy on each axes of the query with the one or more anchor members in the first hierarchy of the database, the first hierarchy being placed on one of the query axes.

The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3A illustrates an exemplary graphical user interface for placing multiple user-defined members after an anchor member.

FIG. 3B illustrates an exemplary user interface for hierarchical ordering of calculated members.

DETAILED DESCRIPTION

Figure 1B:
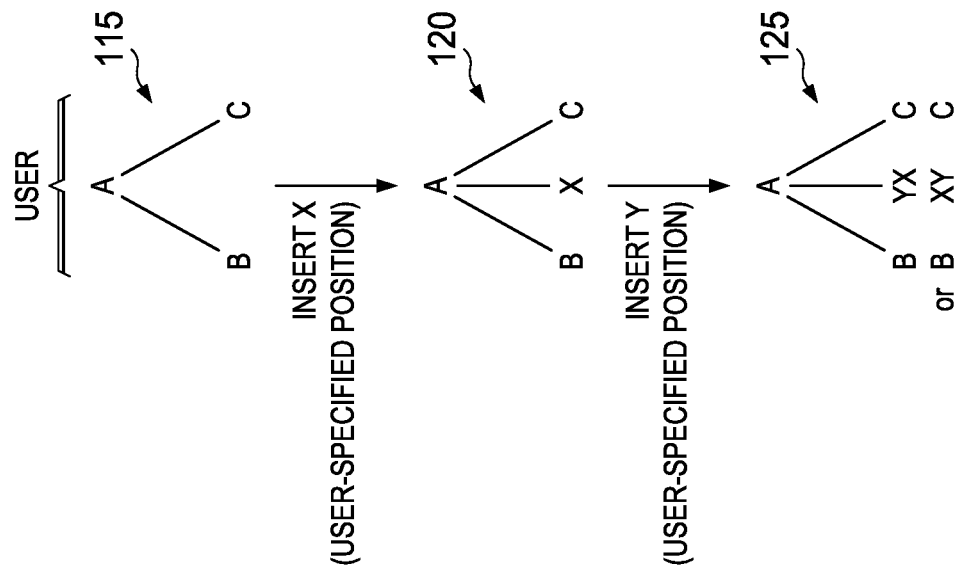
FIG. 1B a process flow for adding a calculation to an OLAP hierarchy in accordance to an embodiment of the invention.

This disclosure generally relates to software, computer systems, and computer-implemented methods for providing improved positioning of user-created data members in OLAP databases. Specifically, this disclosure relates to techniques for enabling users to create data sets for an OLAP hierarchy according to user-specified positions by using an OLAP expression language such as MDX.

First, user-created members positioning for OLAP databases is provided independent of the state of anchor member within result set, and for anchorless or parentless members. Thus, a more flexible (e.g. stateless) user-created members positioning for OLAP databases may be provided.

Second, post-processing of the result set is circumvented and can thus be avoided. This may reduce the overall processing time and resources to provide a sequence of user-defined members and anchor members according to a user-defined order. For example, if one would place user-created members within the result set as a post-processing step, then that would cause potentially huge memory consumption and would be computationally expensive. Thus, a more rapid and/or resource-gentle user-created members positioning for OLAP databases may be provided, especially across network environments.

Third, by using an OLAP language such as MDX, user-created member positioning is delegated to the backend OLAP server so that positioning calculations may be transferred to the query engine on the server side without negatively affecting the performance of query as far as server input/output or database aggregation is concerned.

Fourth, a positioning algorithm is provided that does not require a creation or sorting of a so-called "calculation chain", as described in U.S. Pat. No. 8,255,368 B2, wherein a calculation chain may be an ordered list of calculations and one non-calculated member from the OLAP hierarchy. The order may be a hierarchical or a reverse hierarchical order. A calculation chain may either begin or end with a non-calculated member. Two calculations next to each other in a chain cannot have any non-calculated members existing between them in the OLAP hierarchy.

The above technical advantages may be used for a more efficient monitoring, controlling and/or development of technical processes involving machines, such as logistic processes, resource allocation or transportation.

Multidimensional Expressions ("MDX") is a query language for OLAP databases, like SQL is a query language for relational databases. Thus, an MDX statement can be used to query for a result from an OLAP data source, e.g., an OLAP data cube. MDX queries can be used to specify the addition of a calculation to a hierarchy of multidimensional data. Accordingly, it would be desirable to provide techniques to enable users to create data members in arbitrary positions of an OLAP hierarchy.

The MDX statements may resemble SQL statements that are used to query for data arranged on rows and columns of a data cube. As with an SQL entry, each MDX query requires a data request (the "SELECT" clause), a starting point (the "FROM" clause), and a filter (the "WHERE" clause). These and other keywords provide the tools used to extract specific portions of data from a cube for analysis, e.g., to extract a slice of the cube. In one application, MDX queries can be used to specify the addition of a calculation to a hierarchy of multidimensional data. There are two ways to achieve this. The first uses the MDX "CREATE MEMBER" clause: CREATE MEMBER [CubeName].[hierarchyName]. [ParentName].[MemberName] AS MDX_Expression . . . . The second way uses an MDX "WITH" clause: WITH MEMBER [CubeName].[hierarchyName]. [ParentName]. [MemberName] AS MDX_Expression . . . . THE MDX_Expression determines the value of the calculation. The calculation need not be a dynamic value and a can be a static value. The location of the added calculations in the given hierarchy can only, however, be specified with limited precision. With both the "CREATE MEMBER" and "WITH" clauses above, a calculation may be added to a hierarchy by specifying its parent. The location of a calculation within a sibling group cannot be specified in a native MDX statement.

Figure 1A:
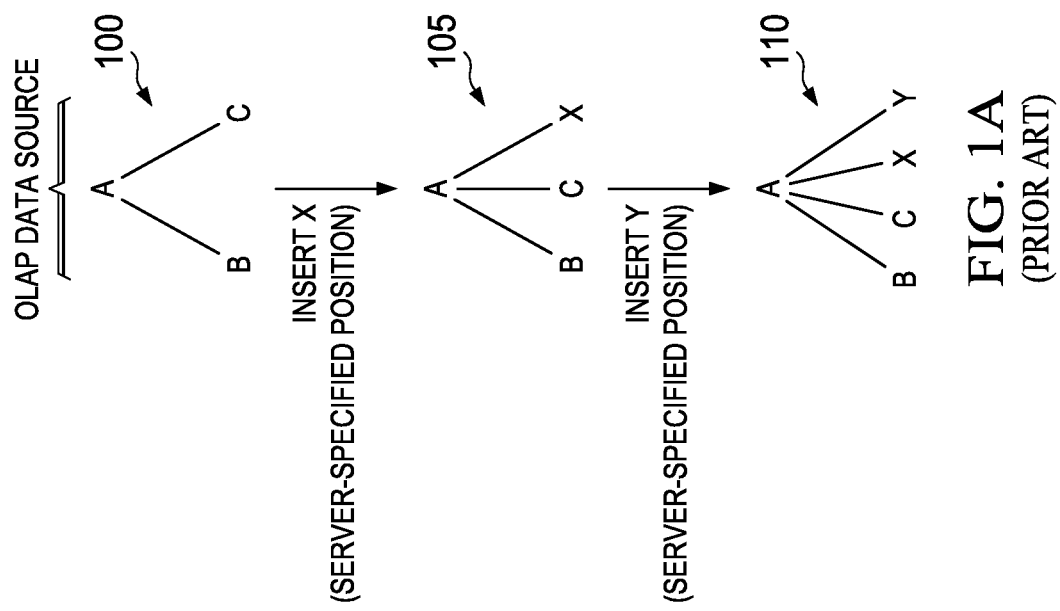
FIG. 1A illustrates a prior art process flow for adding a calculation to an OLAP hierarchy.

FIG. 1A illustrates an example process flow for adding calculations to an OLAP hierarchy 100. OLAP hierarchy 100 includes a root member "A" and two children, "B" and "C". Now consider a user implementing an MDX statement to add a calculation "X" to OLAP hierarchy 100. The user may add the calculation "X" by using either one of the MDX statements above, for example, by using: CREATE MEMBER [MyCube].[MyHierarchy].[A].[X] as '<<expression>>' This MDX statement specifies that the new calculation "X" is to be added to OLAP hierarchy 100 as a child of "A". As illustrated in FIG. 1A, OLAP hierarchy 100 already has two children, "B" and "C". When adding another child to root node "A", the OLAP server does not know the relative position of "X" relative to its siblings, "B" and "C". Accordingly, the OLAP server can only position a new calculation as the last child of the specified parent. In this case, the new calculation"X" can only be added after "C" as the last child of "A", as shown in the updated OLAP hierarchy 105.

The user may add another calculation, e.g., "Y", to OLAP hierarchy 105, using the following MDX statement: CREATE MEMBER [MyCube].[MyHierarchy].[A].[Y] as '<<expression>>' Similarly, this new calculation "Y" can only be added after "X" as the last child of "A", as shown in the updated OLAP hierarchy 11 O. The user cannot, for example, specify that "Y" is to be the first or one of the middle children of "A" in the OLAP hierarchy. Some types of calculations have natural or intuitive positions relative to siblings. For example, when determining the difference between two members in a list of members it is useful to place the calculation between the two members of interest and not at the end of the list. Also, when creating a calculation for each existing member, pairing the calculation besides the member is helpful to the user. In the OLAP hierarchy 100 illustrated in FIG. 1A, for example, if "X" were a calculation to add the values of "B" and "C", it would be useful to place it in between "B" and "C" instead of after "C" as the last child of "A" as shown in OLAP hierarchy 105.

Accordingly, it would be desirable to provide techniques to enable users to create data members in arbitrary positions of an OLAP hierarchy. In particular, it would be desirable to provide techniques to create and evaluate data sets of an OLAP hierarchy according to user-specified positions, wherein the techniques should also work when the insertion member is not visible and wherein the techniques should show a reduced processing complexity.

Terminology

The present invention provides a system, method, software arrangement, and computer readable storage medium for positioning user-created data in OLAP data sources. An "OLAP data source" or "OLAP database", as generally used herein, refers to any multidimensional data source providing a multidimensional conceptual view of data, including full support for hierarchies and multiple hierarchies. The OLAP databases are multi-dimensional databases that are called cubes.

The dimensions are generally organized into hierarchies. An OLAP "hierarchy" or "dimension" may contain a plurality of "members", including non-calculated members (e.g., non-numeric) and calculations (e.g., numeric values), organized in hierarchical order. "Dimension" may be a dimension of the OLAP cube. A dimension may be a primary organizer of measure and attribute information in a cube. MDX may not know or assume any dependencies between dimensions, they may be assumed to be mutually independent. A dimension may contain some members organized in some hierarchy or hierarchies containing levels. It can be specified by its unique name, e.g. [Time] or it can be returned by an MDX function, e.g. .Dimension. Hierarchy may be a dimension hierarchy of a cube. It can be specified by its unique name, e.g. [Time].[Fiscal] or it can be returned by an MDX function, e.g. .Hierarchy. Hierarchies may be contained within dimensions. The "hierarchical order", as generally used herein, specifies the order in which members are visited in a depth first traversal of the hierarchy where parents are ordered before their children.

A "member" is a member in a dimension or hierarchy. It can be specified by its unique name, e.g. [Time].[Fiscal].[Month].[August 2006], by qualified name, e.g. [Time].[Fiscal].[2006].[Q2].[August 2006] or returned by an MDX function, e.g. .PrevMember, .Parent, or .FirstChild. A "tuple" may be an ordered collection of one or more members from different dimensions. Tuples can be specified by enumerating the members, e.g. ([Time].[Fiscal].[Month].[August], [Customer].[By Geography].[All Customers].[USA], [Measures].[Sales]) or returned by an MDX function, e.g. .Item. Only the non-calculated members of the hierarchy may have children. Coordinates in the OLAP cube may be expressed as a tuple. A tuple consists of orthogonal dimension members. It means one member from each dimension. If there are $D_1$ to $D_n$ dimensions (measures included) then a tuple is represented as $(M_1, M_2, \ldots, M_N)$ with one member from $D_1 \ldots D_n$ each, respectively.

The members of an OLAP hierarchy may be organized into one or more "sets", where a set generally refers to a set of members as specified by a user in a MDX "CREATE SET" statement. A set may be a collection of tuples. A "set" may be an ordered collection of tuples with the same dimensionality. It can be specified enumerating the tuples, e.g. {([Measures].[Sales], [Time].[Fiscal].[2006]), ([Measures].[Sales], [Time].[Fiscal].[2007])} or returned by MDX function or operator, e.g. Crossjoin, Filter, Order, Descendants. OLAP queries (particularly MDX queries) generally include sets placed on several axes. Typically, such a query has two or more axes. Tuples can also be specified using a single member, which in that case the missing dimensions will assume default members.

According to an embodiment of the invention, a user may create data sets of an OLAP hierarchy where the set members are in user-specified positions. The user may, for example, create new calculations for an OLAP hierarchy and specify the positions of the new calculations relative to other members of the hierarchy. A graphical user interface ("GUI") may be provided to the user for creating a set of an OLAP hierarchy and adding calculations to the set in user-specified positions. The term "user-specified positions" may include positions to the left or to the right of another member in the set. That is, in addition to specifying the lineage of a new calculation to be added to the OLAP hierarchy, the user may also specify its order relative to its siblings.

For example, consider the process flow illustrated in FIG. 1B for adding calculations to an OLAP hierarchy in accordance with an embodiment of the invention. OLAP hierarchy 115 includes a root member "A" and two children, "B" and "C". In one embodiment, a user may add a calculation to the right or after of an existing member. For example, the user may add calculation "X" as a child of "A" and to the left of "C" and to the right of "B", as in OLAP hierarchy 120. The user may also add calculation "Y" as a child of "A" and to the left of "X" and to the right of "B", as in OLAP hierarchy 125. The user may also add calculation "Y" as a child of "A" and to the left of "C" and to the right of "X", as in OLAP hierarchy 125.

According to an embodiment of the invention, when a user creates a calculation to be added to an OLAP hierarchy in user-specified positions, the calculation is inserted into the OLAP hierarchy using native MDX "CREATE MEMBER" or "WITH" statements (as described above). The calculations are inserted in server-specified positions in the OLAP hierarchy and the OLAP hierarchy is stored in the OLAP server according to those positions, that is, the calculations are inserted in the hierarchy according to their lineage as described above. The OLAP hierarchy is then reorganized to reposition the user-created data from the server-specified positions into the user-specified positions when evaluating data sets from the OLAP hierarchy created by the user. That is, in one embodiment, when a user creates or selects a data set from the OLAP hierarchy to be evaluated, the data set is evaluated according to the user-specified positions of the reorganized OLAP hierarchy.

Computing Environment

Figure 2:
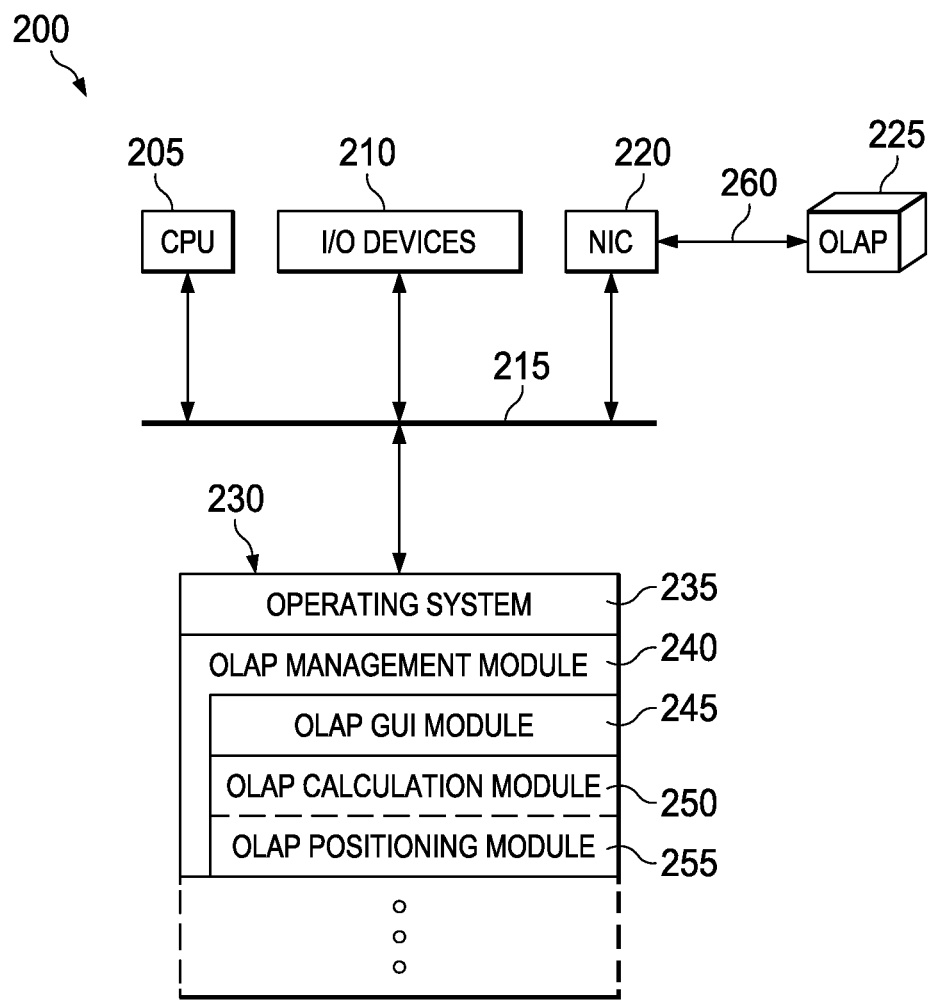
FIG. 2 illustrates a computing environment that can be used in accordance with an embodiment of the invention.

FIG. 2 illustrates a computing environment in accordance with an embodiment of the invention. Computer 200 includes standard components, including a Central Processing Unit ("CPU") 205 and input/output devices 210, which are linked by a bus 215. Input! output devices 210 may include a keyboard, mouse, display screen monitor, printer, and the like. Network Interface Circuit ("NIC") 220 may also be connected to the bus 215. NIC 220 provides connectivity to a wired or a wireless network (LAN or WAN such as the Internet) 260, thereby allowing computer 200 to operate in a networked environment. For example, networked data sources 225 are connected to computer 200 through NIC 220. In accordance with an embodiment of the invention, networked data sources 225 may include an OLAP data source in an OLAP server.

As used in this disclosure, the computer 200 is intended to encompass a personal computer, laptop, tablet PC, workstation, network computer, kiosk, wireless data port, smart phone, personal data assistant (PDA), one or more processors within these or other devices, or any other suitable processing device. The computer 200 may be a mobile communication device. For example, the computer 200 may comprise a computer that includes an input device, such as a keypad, touch screen, mouse, or other device that can accept user information, and an output device that conveys information associated with the operation of one or more client applications, on-demand platforms, and/or the computer 200 itself, including digital data, visual information, or GUI.

The term "interface" generally includes logic encoded software and/or hardware in a suitable combination and operable to communicate with the network 260. More specifically, the interface 220 may comprise software supporting one or more communication protocols associated with communications such that the network or the interface's hardware is operable to communicate physical signals within and outside of the illustrated environment. The term "network" refers to all or a portion of an enterprise or secured network, while in another instance, at least a portion of the network may represent a connection to the Internet. In some instances, a portion of the network may be a virtual private network (VPN). Further, all or a portion of the network 140 can include either a wireline or wireless link. Example wireless links may include 802.11a/b/g/n, 802.20, WiMax®, and/or any other appropriate wireless link. The network 140 may communicate, for example, Internet Protocol (IP) packets, Java Debug Wire Protocol (JDWP), Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations. The WAN may have a latency time of more than 50 ms or more than 200 ms. The user or client device 200 may be connected to the OLAP database across a WAN.

Memory 230 is also connected to the bus 215. In one exemplary embodiment, memory 230 stores one or more of the following modules: an Operating System module 135 and an OLAP Management module 240. Operating system module 235 may include instructions for handling various system services, such as file services or for performing hardware dependent tasks. The OLAP Management module 240 may include executable instructions for performing OLAP related tasks, including supporting a graphical user interface ("GUI") and interfacing with an OLAP data source. The term "memory" refers to any memory or database module and may take the form of volatile or non-volatile memory including, magnetic media, optical media, random access memory (RAM), read-only memory (ROM), removable media, or any other suitable local or remote memory component.

The computer 200 and/or the OLAP database 225 include development technology and hosted and managed services and applications built on top of the underlying platform technology. In an implementation of the present disclosure described herein, the term "platform technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "platform technology" comprises an SAP ByDesign platform, SuccessFactors Platform, SAP NetWeaver Application Server Java, ERP Suite technology or in-memory database such as High Performance Analytic Appliance (HANA) platform.

At a high level, the term "software application" or "software" may include computer-readable instructions (e.g., programming code), firmware, wired or programmed hardware, or any combination thereof on a tangible and non-transitory medium operable when executed to perform at least the processes and operations described herein. Indeed, each software component may be fully or partially written or described in any appropriate computer language including C, C++, Java®, Visual Basic®, assembler, Perl®, any suitable version of 4GL, as well as others. It will be understood that while portions of the software illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various modules or components can be combined into single components, as appropriate.

According to an embodiment of the invention, OLAP Management module 240 includes an OLAP GUI module 245, an OLAP Calculation module 250, and an OLAP Positioning module 255. The OLAP GUI module 245 may rely upon standard techniques to produce graphical components of a user interface, e.g., windows, icons, buttons, menu and the like, for accessing and managing OLAP data source 225. For example, a user may employ the GUI to define and review the results of a query. In one embodiment, the user may also employ the GUI to create and evaluate data sets for OLAP hierarchies in OLAP data source 225, where the set members include user-created calculations in user-specified positions. OLAP Calculation module 250 may include executable instructions to evaluate calculations involving members of an OLAP hierarchy, such as, for example, calculations as part of a set created by the user using OLAP GUI module 245. OLAP Positioning module 255 may include executable instructions to, in accordance with an embodiment of the invention, reorganize OLAP hierarchies in OLAP data source 225 to position the user-created calculations in the OLAP hierarchies according to the user-specified positions.

OLAP Positioning module 255 may work in conjunction with OLAP Calculation module 250 to evaluate data sets created by the user according to the user-specified positions. As described in more detail herein below, this involves the generation of data manipulation statements by OLAP Positioning module 255 to insert the user-created calculations in the user-specified positions in the data sets and return the evaluated set members according to the user-specified positions.

It is appreciated that the executable modules stored in memory 230 are exemplary. It is also appreciated that the functions of the modules may be combined. In addition, the functions of the modules need not be performed on a single computer. Instead, the functions may be distributed across the network 260, if desired.

Indeed, the invention may be commonly implemented in a client-server environment with various components being implemented at the client-side and/or the server-side. For example, one of ordinary skill in the art appreciates that the functions of modules 240-255 may be performed at computer 200 or at a server connected to computer 100. In one exemplary embodiment, some or all of the functions of modules 240-255 may be performed at computer 200. In another exemplary embodiment, some or all of the functions of modules 240-255 may be performed at a server connected to computer 200. As understood by those of ordinary skill in the art, it is the functions of the invention that are significant, not where they are performed or the specific manner in which they are performed. The user or client device 200 may be connected to the OLAP database across a LAN or WAN.

OLAP Hierarchies

FIG. 3A illustrates an exemplary graphical user interface for placing multiple user-defined members after an anchor member. An exemplary OLAP hierarchy as specified by a user with OLAP GUI module 245 is illustrated in FIG. 3A. In this example, user-defined calculation "Autralia+Canada" is defining the total Internet Sales of Australia plus Canada and it is placed after the anchor member Canada. A user-created member (also called custom member, or custom calculation, user-defined members, or user-created calculation) can be anchored to another user-calculated member. In this case, the Internet Sales for Canada and Australia are averaged. The definition of the user-created member, and its positioning, may be orthogonal concepts. They may be independent of each other. The algorithm should receive these two calculations in a set that is ordered as the order of the appearance of the calculation as shown. As described above, sets created by the user are stored in the OLAP database using MDX "CREATE SET" statements, which are usually sorted using the MDX statement "HIERARCHIZE." The MDX statement "HIERARCHIZE" can only position set members according to their lineage. Accordingly, OLAP hierarchy shows the calculations created by the user by lineage and order of creation within a sibling group. It is appreciated that OLAP hierarchy is organized in hierarchical order as allowed by the expressivity of MDX and therefore allowed by the OLAP database, with parents coming before their children and calculated members within a sibling group appearing at the end of the sibling group organized therein, e.g., by order of creation.

If an anchor member has more than one user-created calculation placed after it, then there could be different ways of placing these members. One may employ one or more rules for the positioning, for example: If an anchor member has more than one calculation placed after it, then they appear in order of definition (e.g., chronological order of definition). If any of these calculations have other calculations placed after them, then they take precedence over other siblings as shown in FIG. 3A: "Australia+Canada" is placed after Canada. Also, "Australia−Canada" is placed after Canada. But, "Australia+Canada" has another calculation anchored to is, i.e., "Australia+Canada Avg.", and "Australia+Canada" is defined before "Australia−Canada". OLAP databases may be multidimensional and may also be hierarchical. It means each dimension may be organized into hierarchies. For example, the images of FIGS. 3A and 3B show customer geography hierarchy with respect to Internet Sales.

The calculation positioning algorithm as described herein respects the hierarchical order by anchoring the calculation to anchor member if (e.g., and only if) the anchor member is present in the result set. It means that the calculation may be automatically included, or excluded, depending whether the anchor member is present in the result set, or not. This may have no bearing on the user interface of the product. It may only depend on the query expression for the axes. The anchor member can be hidden generally due to the following events: (i) the branch is collapsed, or (ii) a subset of the original result set is displayed (e.g., which is substantially a window of the overall result set, and the window does not include the anchor member).

In the event the anchor member is filtered from the result set (e.g., the user has chosen to filter it), then the software would switch the anchor member to another appropriate member prior to positioning. There may be other boundary conditions, such as filtering all of the members of a level, and these may be covered by changing the positioning algorithm input parameters. The algorithm may still function based on presence of the anchor member in the result set. FIG. 3B shows an expanded view of the Canada member. As it can be seen, the members Alberta and British Columbia have calculated members placed after them respectively but those user-defined members won't be visible if the corresponding nodes are collapsed. In U.S. Pat. No. 8,255,368 B2, the software needs to be "stateful", while with the present invention the positioning algorithm may not need any state at all. For example, in U.S. Pat. No. 8,255,368 B2 (FIG. 25 therein), the software needs to be aware of the state of the current result set before inserting calculation chains. For example, in the aforementioned figure, if Beverages node is collapsed, or C6 (the calculated member) anchor member, which is Drinks, is expanded then the calculation chain that includes C6 may not be submitted to the algorithm or else the algorithm will break, or generates wrong result. The positioning algorithm as described below may be completely stateless. The software that uses this algorithm may not need to know the state of the anchor members.

Positioning Algorithm

Figure 4:
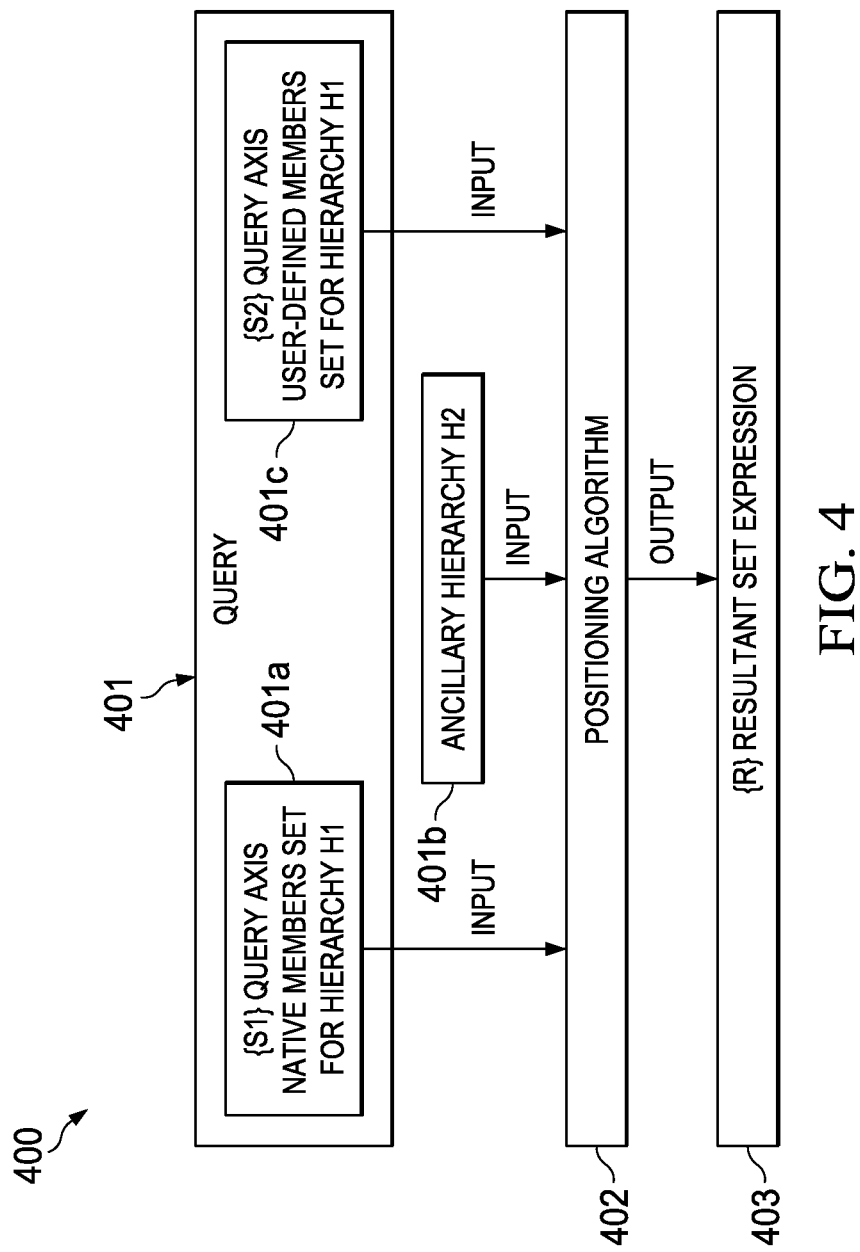
FIG. 4 illustrates an overview flow chart for positioning user-created data in an OLAP database in accordance with an embodiment of the invention.

FIG. 4 illustrates an overview flow chart 400 for positioning user-created data in an OLAP database in accordance with an embodiment of the invention. The user may use client device 200 to submit a request or query 401 a server of the OLAP database 225 for positioning user-created members in relation to an anchor member in a hierarchy of the OLAP database 225. In return, the user is provided, at the client device and by the server, with a result set 403 that was calculated by a positioning algorithm 402 that was executed on the server, wherein the result set 403 provides the user-created members and the anchor member in the hierarchy in the order as desired by the user. To do so, OLAP Positioning module 255 generates data manipulation statements to evaluate the user-created set according to the desired, i.e., user-specified order.

The user may provide input along with the query 401 via client device 200. The user may submit a single query 401 which includes the input information 401a, 401c, or the user may submit two or more queries, wherein the input information is distributed across the multiple requests. For example, the user may submit two separate queries 401a, 401c, each containing the corresponding input information 401a, 401c. The ancillary hierarchy 401b may be determined (e.g., by the OLAP server) in a pre-processing operation after receiving the query from the client device and before the execution of the positioning algorithm 402 described herein.

S1 may be the set of anchor members (e.g., native members pre-existing in the database or a user-created member) for a hierarchy H1 that are specified by the query, which is initiated by the user. This set may not be a literal set. It means it could be an OLAP language expression. For example, it might be m1.Children( ), which signifies set of children of member m1. The software may also determine an ancillary dimension (or hierarchy) H2 401b prior to calling the positioning algorithm, as described in context of the positioning algorithm below. S2 may be the set of user-created members (e.g., "calculations") for the hierarchy H1. This should be in form of a set of data structures that contains information about these user-defined members. The information given in the query for each user-defined member may be as follows:

A. The definition for the user-defined member as an OLAP language expression. OLAP expressions may be provider-specific. For example, "1+1" may be valid MDX definition.

B. The identifier for the user-defined member; for example its unique or unambiguous name. Unique or unambiguous names may be OLAP provider-specific. For example, [H1].[xyz] may be a valid unique name in MDX, given that H1 is hierarchy name. Obviously, there shouldn't be any more 'xyz' members on the same level of the hierarchy (hence the 'unique' name).

C. The identifier (e.g., unique or unambiguous name) for the anchor member (e.g., The anchor can also be another user-defined member. The fully qualified names (or unique names) for these members are provider-dependent, but a unique name is always a single string of characters. For example, [H1].[Provinces].[Alberta] is a unique name in MDX. But, other flavors of MDX, or other OLAP languages use different formats.

D. The identifier for the parent of the user-defined member. The parent of a member may be located in the OLAP hierarchical level immediately above the member. For example in FIG. 3B, parent of user-defined calculation "Alberta Prediction" is "Canada".

FIGS. 5A-D illustrate operations of the positioning algorithm 402 shown in FIG. 4 in a flow chart 500. One purpose of this invention may be to avoid post-processing of the result set. Instead, the OLAP expression for set S1 in FIG. 4 may be modified in such a way that it includes the user-defined members in their right positions and order according to the user-specified order. A requirement or boundary condition of the positioning algorithm may be that the user-created members that are anchored to the same anchor member are positioned in the same order that they appear in the set S2. For example, if set S2={"Alberta−Canada", "Alberta+Canada"} and they are both anchored to native member Canada, then the positioning algorithm will place "Alberta−Canada" first, and then "Alberta+Canada" next to it (hence, order refers to OLAP hierarchical ordering). Also, the calculations that are anchored to another calculation must appear after their anchor in set S2. The flowchart in FIGS. 5A-D shows a general process of generating the OLAP query expression that is consequently sent to the server for execution.

In the flow chart 500, the positioning algorithm may be subdivided into building of OLAP expressions for calculated member sets 501, starting of a main loop 502, determining anchor members for the user-created members 503, calculating auxiliary members 504, creating a set of identified parentless user-created members 505, and creating a final result set of members 506.

Step 1 in 501 may use a common data structure called a map (or associative array). A map maps a key to a value. Using a map calculation's unique name is mapped to an object (memory address of calculation object, or value). The object can be retrieved using the unique name of the calculation. This map may be used in Step 5 of 503. Step 3 in 501 may be used in that the set that is fed into the positioning mechanism is free of any user-created members that may be placed by default. The input list in FIG. 4 may contain calculated members, but they are not in their right position. Imagine to be the following: Input List={M1, M2, C1, M3, C2, M4}; But the desired positioning is C1 to be placed after M3. So, Step 3 of the algorithm in FIG. 5A creates the following OLAP expression: List=Except ({Input List}, {M1, M2, C1, M3, C2, M4}). Now, when this is included in the OLAP query, the list becomes {M1, M2, M3, M4}.

User-created calculation may be supplied to the positioning algorithm (e.g., a Java routine) specified in FIGS. 5A-D as a set of data structures. The data structure (a class in object-oriented paradigm) may include the following fields:

```
Class Calc
{
  String uniqueName;
  String parent;
  String previousMember;
  ScalarExpression expression; // definition of the calculation
  Hierarchy hierarchy; // instance of hierarchy that this
calculation belongs to
}
```

In an aspect, the "value" in map refers to an instance (a memory address) that contains the information above. So, the map may recur back to the point where it cannot find anymore calculated member anchors. For example, if C4 is anchored to C2 and C2 is anchored to C1 and C1 is anchored to a native member, then the loop over step 5 finds C1 and uses C1's anchor to place C4. Since C1, C2 and C4 all end up with the same anchor, they are placed sequentially one after the other. Therefore, the input list of user-created members ("calcs") may then include user-created members in this order: C1, C2, C4.

The function of the part 503 may be to identify the first anchor member (e.g., native member) in a sequence of calculated members that placed one after the other. For example, if user-created member (e.g., calculation) C2 is placed after user-created member C1, and C1 is placed after anchor member M1, then this part 503 of the algorithm may assign C1 to loop variable 'c'. Eventually c's anchor member is used to place C2, but because the above mentioned requirement for the algorithm may dictate that C1 must have appeared before C2 in set S2, then the positioning will work as desired. Steps 6 to 13 in 504-506 may generate OLAP expressions that are put together to form the final query expression. They are explained below.

The algorithm described in FIGS. 5A-D may generate one or more OLAP query expressions, and it may run inside a Java process. The OLAP expressions generated may be sent to an OLAP database server to be executed. In this section, the term "hierarchy" and "dimension" may be used interchangeably. The reason is that for some OLAP providers hierarchies are orthogonal, and for some providers they are not. Thus, a different dimension is used for positioning the calculation, instead of a different hierarchy. The main idea is that the calculation positioning requires an ancillary dimension (or hierarchy) H2 401b that may be mathematically orthogonal to the hierarchy that contains the main query's hierarchy/dimension H1. Some variable names were changed from previous sections in the MDX snippets below that are explained as follows. In FIG. 4 above, the name of the input set is S1. In the code snippets below, it is called "_ORG_AXIS_SET". The ancillary hierarchy H2 is replaced with dimension "Dim1".

The calculations may be assigned anchor members (or previous members) that are used to place them within the axis set. The calculations which have no parents (root level calculations, or parentless calculations) may be placed at the end of axis hierarchy set using a union operation (e.g., Steps 12, 13 in 506). The placement mechanism may work by first introducing an auxiliary calculated member (also referred to as "calculation positioning calculation"). This calculated member holds the rank of the original calculation's anchor member within the axis set. For example, assuming the original query (in MDX language) looks like the following:

```
WITH
    MEMBER [Measures].[calc1] as '1'
SELECT
    { [Measures].AllMembers } on 0
FROM [cube]
```

Then, the positioning calculation will be as follows:

```
WITH
    MEMBER [Measures].[calc1] as '1'
    SET [_ORG_AXIS_SET] as '{ [Measures].AllMembers }'
    MEMBER [Dim1].[posCalc1] as
'Rank(calc1PreviousSibling, [_ORG_AXIS_SET])'
SELECT
    {
      SUBSET([_ORG_AXIS_SET], 0, [Dim1].[posCalc1]),
      {[Measures].[calc1]}),
```

```
      SUBSET([_ORG_AXIS_SET], [Dim1].[posCalc1]+1)
    } on 0
FROM [cube]
```

Hence, calc1PreviousSibling is [Measures].[calc1] previous sibling that must be specified as part of calculation definition in order for us to be able to place this calculation explicitly with the axis set. In the above query the set [_ORG_AXIS_SET] is split into two subsets and calc1 member is placed in between the two subsets (In MDX {set1, set2} is a shorthand for Union(set1, set2)). This is the basic mechanism used here to place the members. If there is more than one member then the placement becomes:

```
WITH
    MEMBER [Measures].[calc1] as '1'
    MEMBER [Measures].[calc2] as '1 + MEMBER
[Measures].[calc1]'
    SET [_ORG_AXIS_SET] as '{ [Measures].AllMembers }'
    MEMBER [Dim1].[posCalc1] as
'Rank(calc1PreviousSibling, [_ORG_AXIS_SET])'
    MEMBER [Dim1].[posCalc2] as
'Rank(calc2PreviousSibling, [_ORG_AXIS_SET])'
SELECT
    {
      ...
    } on 0
FROM [cube]
```

The issue with this placement may be that one wouldn't know ahead of time which calculation positioning is lower in rank than the other ones. In the above example, one wouldn't know whether posCalc1 is higher, or posCalc2 is higher. Consequently, we wouldn't be able to properly create subsets to position the calculations because we wouldn't know whether calc1 must appear before calc2 or vice versa.

Thus, we need to somehow order the rank positions (i.e., posCalc1 and posCalc2) in order to properly place calculations within axis hierarchy set. The following query mechanism is used here to achieve that (called herein "Query (1)"):

```
WITH
    MEMBER [Measures].[calc1] as '1'
    MEMBER [Measures].[calc2] as '1 + MEMBER
[Measures].[calc1]'
    MEMBER [Measures].[calc3] as '1 + MEMBER
[Measures].[calc2]'
    SET [_ORG_AXIS_SET] as '{ [Measures].AllMembers }'
    MEMBER [Dim1].[posCalc1] as
'Rank(calc1PreviousSibling, [_ORG_AXIS_SET])'
    MEMBER [Dim1].[posCalc2] as
'Rank(calc2PreviousSibling, [_ORG_AXIS_SET])'
    MEMBER [Dim1].[posCalc3] as
'Rank(calc3PreviousSibling, [_ORG_AXIS_SET])'
    SET [posSet] as '{
      ([Dim1].[posCalc1],[Measures].[calc1]),
      ([Dim1].[posCalc2],[Measures].[calc2]),
      ([Dim1].[posCalc3],[Measures].[calc3]) }'
    SET [orderedPosSet] as 'Order(posSet,
posSet.item(0).item(0).Dimension.CurrentMember,
                                                 BASC)'
SELECT
    {
      Union(Subset([_ORG_AXIS_SET],
                        0,
                        [orderedPosSet].Item(0),Item(0)),
                  {[orderedPosSet].Item(0),Item(1)}),
      Union(Subset([_ORG_AXIS_SET],
                        [orderedPosSet].Item(0),Item(0),
                        ([orderedPosSet].Item(1),Item(0) –
```

```
                    [orderedPosSet].Item(0),Item(0))),
                {[orderedPosSet].Item(1),Item(1)}),
            Union(Subset([_ORG_AXIS_SET],
                        [orderedPosSet].Item(1),Item(0),
                        ([orderedPosSet].Item(2),Item(0) –
    [orderedPosSet].Item(1),Item(0))),
                {[orderedPosSet].Item(2),Item(1)}),
            Subset([_ORG_AXIS_SET],
        Tail([orderedPosSet]).item(0).item(0))
        } on 0
    FROM [Cube]
    WHERE (Dim1.Mem1)
```

In an aspect, posSet in the above query may be a two dimensional set consisting of tuples that consist of the calculation position with the calculation itself. It is important to note that the calculation position must be created on a different dimension that the calculation itself; otherwise, posSet cannot be created since tuple members must be of different dimensionality. Consequently, posSet is ordered based on position of the calculations (i.e., Dim1 current member in query context) that will yield orderedPosSet. In definition of orderedPosSet, the statement posSet.item(0).item(0).Dimension.CurrentMember may mean: the current member of the dimension of the first member of the first tuple (hence item(0) is a method that returns the first member, or first tuple) of posSet, which is effectively sort by numerical value of posCalc1, posCalc2, etc.

In an aspect, the input illustrated in FIG. 4 includes (i) a definition for set [_ORG_AXIS_SET], (ii) a list of data structures containing calculation definitions, and (iii) a unique name for the ancillary hierarchy H2. In Query (1) above, number (i) above is '{[Measures].AllMembers}' (an OLAP expression). Number (ii) above is a Java list (i.e., array) of calculated members data structures as described to the answer above. Number (iii) in Query (1) is [Dim1]. In Query (1), [Dim1].[posCalc1] to [Dim1].[posCalc3] are calculation positioning ancillary calculations that are not used in U.S. Pat. No. 8,255,368 B2. U.S. Pat. No. 8,255,368 B2 just splits the original set based on anchor member position. In this algorithm, to the contrary, the rank of anchor member is another calculation on the ancillary hierarchy/dimension H2.

In the above example orderedPosSet is a numerically sorted set containing numerical index of where each user-specified calculation must be placed within the axis set, therefore we can use it to dissect the _ORG_AXIS_ET using subset calls. It is worthwhile analyzing one of the union and subset calls above to understand how they are constructed. Assuming that orderedPosSet is evaluated to this set:
    orderedPosSet={(1, [Measures].[calc1]), (3, [Measures].[calc2]), (15, [Measures].[calc3])}
Then, one can rewrite the union/subset set above as follows (referred to as "snippet (1)" herein):

```
    ...
    {
            Union(Subset([_ORG_AXIS_SET], 0, 1),
    {[Measures].[calc1]}),
            Union(Subset([_ORG_AXIS_SET], 1, (3 – 1)),
    {[Measures].[calc2]})
            Union(Subset([_ORG_AXIS_SET], 3, (15 – 3)),
    {[Measures].[calc3]})
            Subset([_ORG_AXIS_SET], 15)
    }
    ...     -- Snippet (1)
```

The above described query mechanism may be complete except a few edge cases discussed below:
1. The calculation's previous sibling (or anchor) is expanded on the cross tab and all its children are present. In this scenario the calculation must be placed after the last visible child of previous sibling.
2. The previous sibling is not on the axis set, but its children are. Thus, placing the calculation after the last visible child is not enough and we have to also check whether the previous sibling is present, or not.
3. If none of the calculations are present (i.e., the Rank of their previous sibling within the set is 0), then, the subsets will not yield proper result; and the final result should be equal the original axis set.

Items 1 and 2 above can be taken care of when the algorithm creates the calculation positioning calculations as described below: Instead of creating a simple rank, a conditional rank is created based on whether calculation's previous sibling is present, or not; and instead of using the rank of the previous sibling directly, the rank of the last member of the intersection set of previous sibling, and its children, with the original set, is used. The following example, clarifies the implementation (referred to as "snippet (2)" herein):

```
MEMBER [Dim1].[posCalc1] as
            'IIf(
                    Contains(calc1PreviousSibling,
[_ORG_AXIS_SET]),
                    Rank(
                        Tail(
                            Intersect(
Descendants(calc1PreviousSibling),
                                    [_ORG_AXIS_SET]
                                )
                        ).Item(0),
                        [_ORG_AXIS_SET]
                    ),
                    0
                )'
    ...     -- Snippet (2)
```

In an aspect, calculation positioning calculations (i.e., posCalc1 in Query (1)) on the ancillary hierarchy are presented in Snippet (2). This definition may take care of cases where the anchor member may not be present in the result set, and in cases where the previous member is expanded and its children, or descendants are showing. In Query (1), the calculation positioning calculations are coupled with the actual calculation they are representing using a tuple, and placed in a set called [posSet]. The calculation positioning calculation may be located on an ancillary hierarchy (or dimension) and can be placed in a tuple alongside the calculation that it represent its position. In Query (1), this [posSet] is sorted using the position of the calculation within the result set. Then, the calculations in this ordered set are in the order of appearance of the final set. Thus, we can sequentially split the input set (set {S1} in FIG. 4, or [_ORG_AXIS_SET] in Query (1)) and place the calculation that belongs to that position and union the rest of the set back.

The Contains function in snippet (2) returns true, or false, based on whether [_ORG_AXIS_SET] contains the calc1PreviousSibling, or not. If [_ORG_AXIS_SET] doesn't include the previous sibling, then the posCalc1 will be 0 (which means it won't be included in any subset as described further below). If the previous sibling is present in the result set, then the rank of the calculation is obtained by ranking the last member of the following set:

```
Intersect(
        Descendants(calc1PreviousSibling),
        [_ORG_AXIS_SET]
        )
```

In an aspect, the ancillary hierarchy is used in creating positioning calculations, as in "Snippet (2)". We present an example below to dissect the algorithm: Assume the followings: original axis set is S1={M1, M2, M3, M4, M5}, calculations are S2={C1, C2}, and they are supposed to be placed after M4 and M2, respectively. Suppose the ancillary hierarchy (or dimension) unique name is [Dim1]. Now, we create two calculation on this ancillary hierarchy for each of C1 and C2. These are called posCalc1 and posCalc2. They represent rank of C1's and C2's anchor members, respectively (this summarizes the steps 10 and 11 in FIG. 5C):

[Dim1].[posCalc1] as Rank(M4, {S1})
[Dim1].[posCalc2] as Rank(M2, {S1})

Since we have S1 as a literal set we can substitute their numeric values as follows:

[Dim1].[posCalc1] as '3'
[Dim1].[posCalc2] as '1'

Now, an ancillary set is created including tuples made from user-created calculations (e.g., C1 and C2) and their corresponding positions created above, which are the really the position of their anchor member.

Set [posSet] as {(3, C1), (1, C2)}

Then, we sort this posSet based on the values of the first members of each tuple in it: Set [orderedPosSet] as Order (posSet, posSet.item(0).item(0).Dimension.CurrentMember, BASC). Thus, orderedPosSet={(1, C2), (3, C1)}. This orderedPosSet is used to create subsets of the original set (S1). The pseudo code below shows the main loop that generate the final set:

```
Declare set s = { }
While i <= calc_count
    If (i == 0)
        // the first counter initiates s, and starts the
subset with index 0 and ends at orderedPosSet
        // first tuple's first member (i.e.,
[orderedPosSet].Item(i).Item(0)). Then, union the calculation
with that subset
        //
        // in the above example [orderedPosSet].Item(0) = (1,
C2), and [orderedPosSet].Item(i).Item(0) = 1
        //
        s = IIF([orderedPosSet].item(i).item(0) = 0,
            { },
            Union(Subset([S1], 0,
[orderedPosSet].Item(i).Item(0)),
{[orderedPosSet].Item(i).Item(1)}))
    else
        // union the s with a subset of S1 which starts at the
index obtained from
        // [orderedPosSet] i-1's tuple's first member, and add
as many as:
        // [orderedPosSet] i's tuple's first member minus
[orderedPosSet] i-1's tuple's first member
        //
        // in the above example the subset would be:
Subset([S1], 1, 3-1), which starts at 1 and adds 2 members
        // from that index forward
        //
        s = Union(s,
            IIF([orderedPosSet].Item(i).Item(0) = 0,
                { },
                Union(
                    Subset([S1],
                        [orderedPosSet].Item(i-1).Item(0),
                        ([orderedPosSet].Item(i).Item(0) -
[orderedPosSet].Item(i-1).Item(0))),
                        {[orderedPosSet].Item(i).Item(1)})))
        if (i == calc_count - 1)
            // now we union the tail end of the set. This is always
the last union
            // tail function hence returns the last tuple of
orderedPosSet, and Subset function with
            // one argument returns all the members from that index
to the end of the set
            s = Union(s,
                Subset([S1],
                    Tail([orderedPosSet]).item(0).item(0)))
    End While
    return IIF(
        Count(
            Filter([orderedPosSet],
                ([orderedPosSet].Item(0).Item(0).dimension.-
CurrentMember <> 0)
            ),
            EXCLUDEEMPTY
        ) = 0,
        [S1],
        s)
```

The above set is a set consisted of calc1PreviousSibling and all its children intersected with the original axis set. It means it includes any visible calc1PreviousSibling children (and obviously calc1PreviousSibling itself). Placing the calc1 after the above set (i.e., placing after the last member of the above set within [_ORG_AXIS_SET]) will take care of the item 2 above whereby if previous sibling is expanded then the calculation is placed properly after the last child in the cross tab. If any of posCalcX variables have non-zero values then the subset in Query (1) above would work properly. However, if some of they end up being zero then the subsetting operations won't work properly as shown in Snippet (1) above. Thus, one may filter out calculations that have rank zero. In order to eliminate zero-rank subsets (where calculation previous sibling has rank 0), Query (1) subsets are augmented as follows (herein referred to as "snippet (3)"):

```
...
    {
        IIF(([orderedPosSet].Item(0).Item(0) = 0),
            { },
            Union(Subset([_ORG_AXIS_SET], 0,
[orderedPosSet].Item(0).Item(0)),
                {[orderedPosSet].Item(0).Item(1)}),
        IIF(([orderedPosSet].Item(1).Item(0) = 0),
            { },
            Union(Subset([_ORG_AXIS_SET],
                [orderedPosSet].Item(0).Item(0),
                ([orderedPosSet].Item(1).Item(0) -
[orderedPosSet].Item(0).Item(0))),
                {[orderedPosSet].Item(1).Item(1)}),
        IIF(([orderedPosSet].Item(2).Item(0) = 0),
            { },
            Union(Subset([_ORG_AXIS_SET],
                [orderedPosSet].Item(1).Item(0),
                ([orderedPosSet].Item(2).Item(0) -
[orderedPosSet].Item(1).Item(0))),
                {[orderedPosSet].Item(2).Item(1)}),
        Subset([_ORG_AXIS_SET],
            Tail([orderedPosSet]).item(0).item(0))
    }
... -- Snippet (3)
```

Hence, IIF function may be essentially an "if . . . then . . . else"-function. It may return an empty set if orderedPosSet rank is zero for any of the calculations. It means Note that the first and last subsets are different, as the first subset starts from index 0, always; and the last subset doesn't need to specify an ending index and it only needs the largest index in orderedPosSet. Hence, the last subset uses Tail function to obtain the last (and largest) index in ordered-PosSet. So far the algorithm has taken care of the two first edge cases discussed above; the third edge case is where none of the user-specified calculations are present. In that case none of the subsets in Snippet (3) would yield non-empty results, except the last one which results in a subset equivalent to the axis set. Therefore, the algorithm can avoid the last subset by applying an optimization as follows:

```
...
IIF(
    Count(
        Filter([orderedPosSet],
([orderedPosSet].Item(0).Item(0).dimension.CurrentMember
<> 0)
        ),
            EXCLUDEEMPTY
    ) = 0,
    [_ORG_AXIS_SET],
    {
    IIF(([orderedPosSet].Item(0).Item(0) = 0),
        { },
        Union(Subset([_ORG_AXIS_SET], 0,
[orderedPosSet].Item(0).Item(0)),
                    {[orderedPosSet].Item(0).Item(1)}),
    IIF(([orderedPosSet].Item(1).Item(0) = 0),
        { },
        Union(Subset([_ORG_AXIS_SET],
[orderedPosSet].Item(0).Item(0),
([orderedPosSet].Item(1).Item(0) –
[orderedPosSet].Item(0).Item(0))),
                    {[orderedPosSet].Item(1).Item(1)}),
    IIF(([orderedPosSet].Item(2).Item(0) = 0),
        { },
        Union(Subset([_ORG_AXIS_SET],
[orderedPosSet].Item(1).Item(0),
([orderedPosSet].Item(2).Item(0) –
[orderedPosSet].Item(1).Item(0))),
                    {[orderedPosSet].Item(2).Item(1)}),
        Subset([_ORG_AXIS_SET],
Tail([orderedPosSet]).item(0).item(0))
    }
    )
...
```

The above statement may return [_ORG_AXIS_SET] without modification if orderedPosSet does not contain any non-zero value in it. It basically means that if calcs are not appearing in the result set then cost of placement will be zero as none of auxiliary calculations will be evaluated in query context. This algorithm may render the following: In Query (1) above, Dim1 dimension may be used both in the slice (WHERE clause) and as a dimension to place the auxiliary calculations onto. Although Dim1 is used as part of ordered-PosSet on axis 0 (i.e., columns), and also in the slicer, the query is still valid (normally you cannot use one dimension on two axes of a query). The reason is that none of the posCalcX variables are used to resolve cell context. This shows that using this mechanism may in effect transfers calculation positioning calculations to the query engine on the server side, and it has no negative effect on the performance of the query as far as server input/output or OLAP cube aggregation is concerned.

Figure 5A:
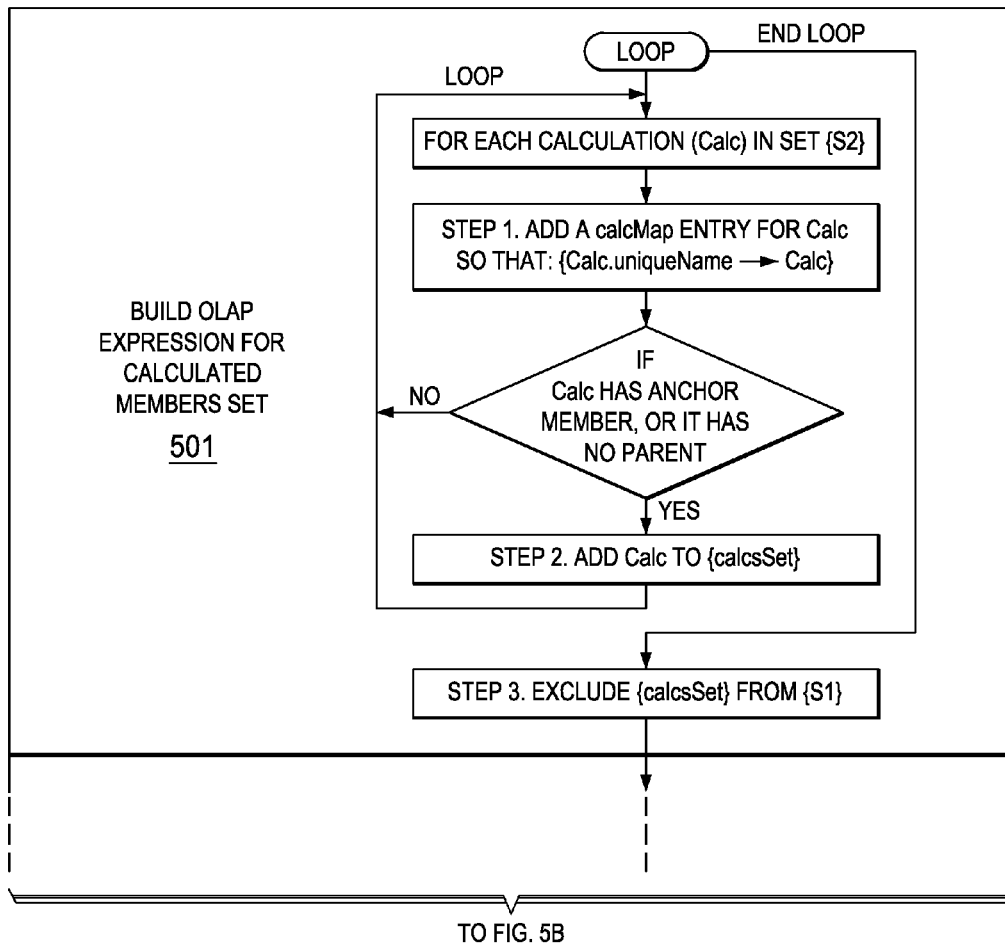
FIG. 5A-D illustrates a flow chart for generating data manipulation statements to evaluate the set based on the user-specified positions for the user-created calculations in accordance with an embodiment of the invention.
Figure 5B:
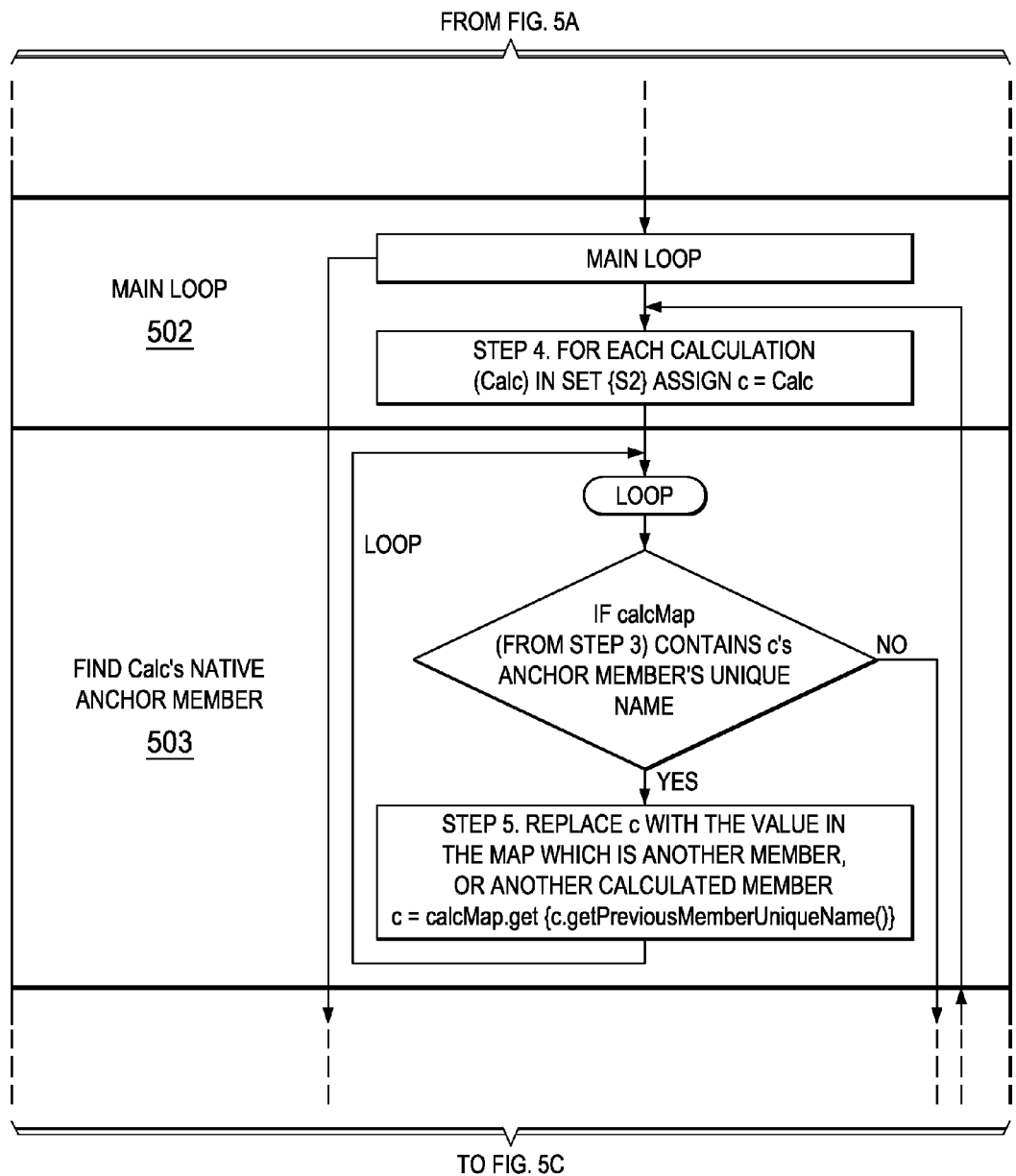
Figure 5C:
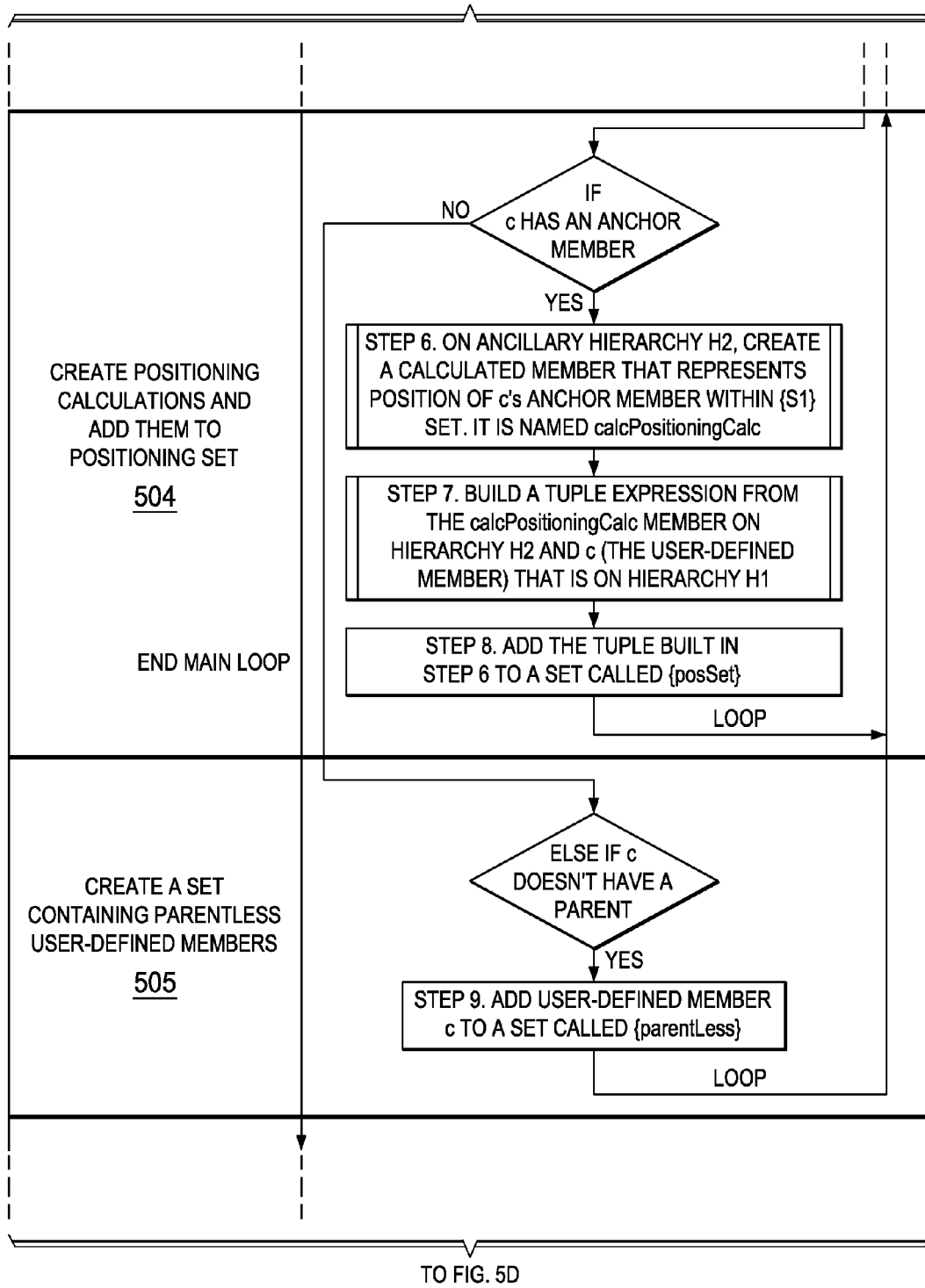
Figure 5D:
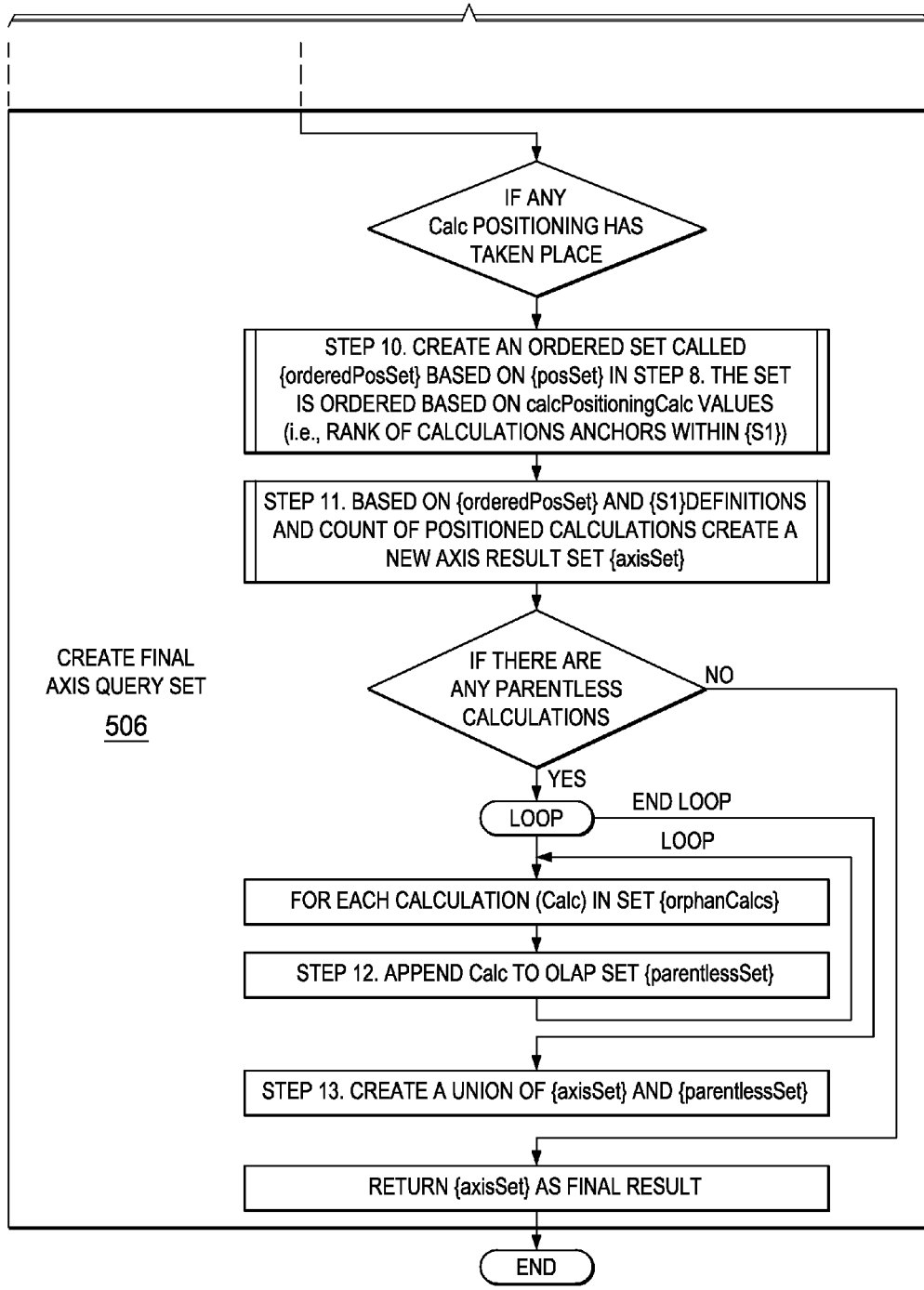
Figure 6:
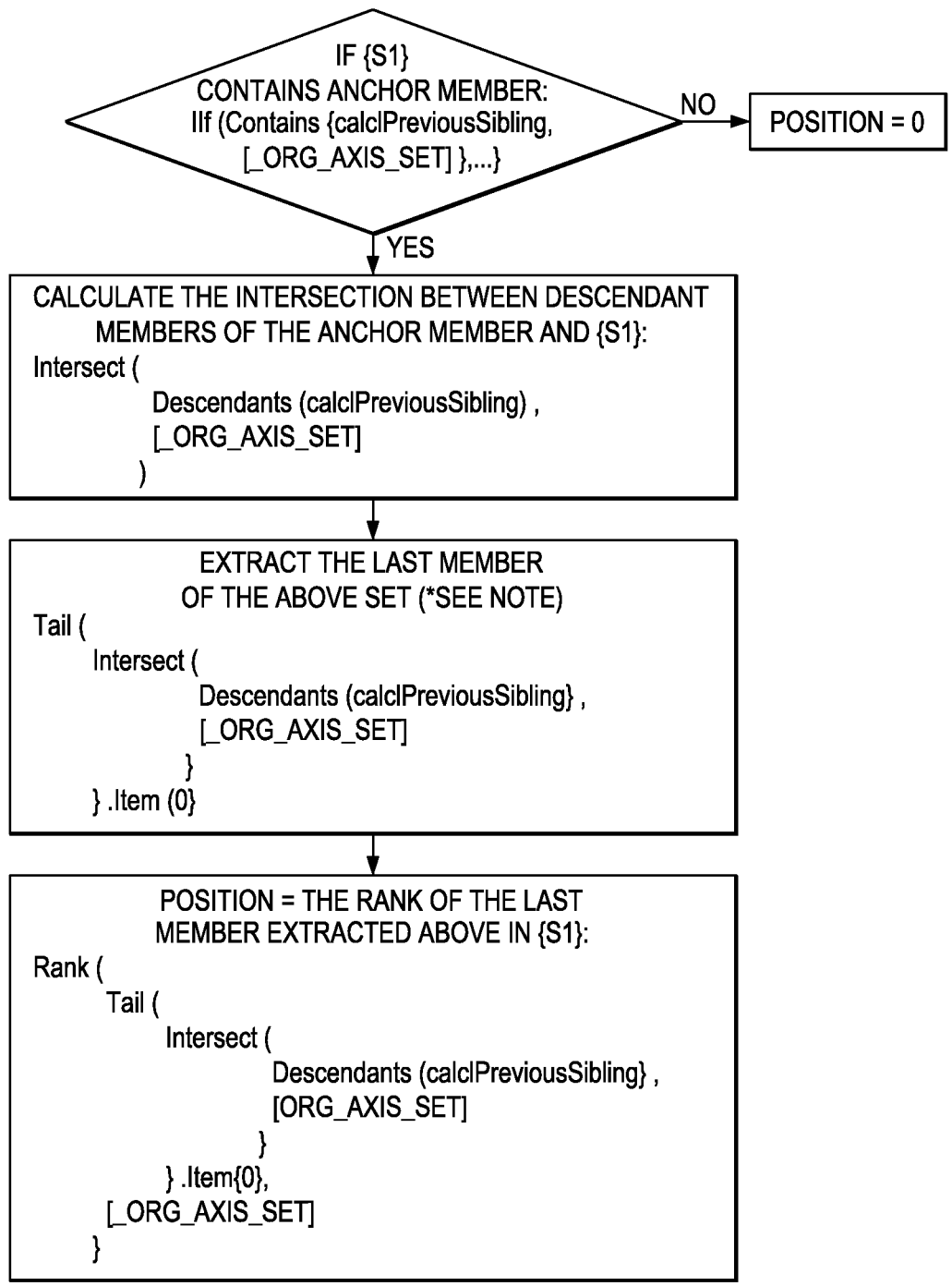
FIG. 6 illustrates an a flow chart for the method to calculate member positions as part of the positioning algorithm.

FIG. 6 illustrates how steps in FIGS. 5A-D generate the calculation positioning of a user-created member in the previous paragraphs (e.g., in 504 of FIG. 5B). Step 6 in FIG. 5B generates one "snippet (2)", as shown above, per calculated member on the input hierarchy (hierarchy H1 in FIG. 4).

Step 7 and 8 from FIG. 5B generate a positioning set including tuples that may look like the following:

```
{
    ([Dim1].[posCalc1], [Measures].[calc1]),
    ([Dim1].[posCalc2], [Measures].[calc2]),
    ([Dim1].[posCalc3], [Measures].[calc3])
}
```

The above set is taken from "Query (1)" above. The tuples made from members from ancillary positioning dimension (or hierarchy H2 in FIG. 4), and the actual user-defined member from hierarchy H1 in FIG. 4. This set may be a tool to associate a position with a user-defined calculated member. Now, the above set is ordered in Step 10 of FIG. 5B. The ordering may be based on the first members of the tuples since those are the actual position of the associated calculated member. As a result, we would have the followings added to the query (highlighted in Italic):

```
WITH
    MEMBER [Measures].[calc1] as '1'
    MEMBER [Measures].[calc2] as '1 + MEMBER
[Measures].[calc1]'
    MEMBER [Measures].[calc3] as '1 + MEMBER
[Measures].[calc2]'
    SET [_ORG_AXIS_SET] as '{ [Measures].AllMembers }'
-- this is set S1
    MEMBER [Dim1].[posCalc1] as
        'IIf(
            Contains(calc1PreviousSibling,
[_ORG_AXIS_SET]),
            Rank(
                Tail(
                    Intersect(
Descendants(calc1PreviousSibling),
                                    [_ORG_AXIS_SET]
                    )
                ).Item(0),
                [_ORG_AXIS_SET]
            ),
            0
        )'
    MEMBER [Dim1].[posCalc2] as
        'IIf(
            Contains(calc2PreviousSibling,
[_ORG_AXIS_SET]),
            Rank(
                Tail(
                    Intersect(
Descendants(calc2PreviousSibling),
                                    [_ORG_AXIS_SET]
                    )
                ).Item(0),
                [_ORG_AXIS_SET]
            ),
            0
        )'
    MEMBER [Dim1].[posCalc3] as
        'IIf(
            Contains(calc3PreviousSibling,
[_ORG_AXIS_SET]),
            Rank(
                Tail(
                    Intersect(
Descendants(calc3PreviousSibling),
                                    [_ORG_AXIS_SET]
                    )
                ).Item(0),
                [_ORG_AXIS_SET]
            ),
            0
        )'
```

```
    SET [posSet] as '{
([Dim1].[posCalc1],[Measures].[calc1]),
([Dim1].[posCalc2],[Measures].[calc2]),
([Dim1].[posCalc3],[Measures].[calc3]) }'
    SET [orderedPosSet] as 'Order(posSet,
posSet.item(0).item(0).Dimension.CurrentMember,
                                      BASC)'
```

The parameter BASC that is supplied to Order function basically means breaking ascending sort. Breaking means that sorting will ignore hierarchical ordering of the members. It can safely be ignored because it is provider specific (Essbase default sort is breaking, so no need to supply the parameter). Step 11 of the same figure finally unifies all of this to form the following:

```
    ...
    IIF(
        Count(
            Filter([orderedPosSet],
        ([orderedPosSet].Item(0).Item(0).dimension.CurrentMember
        <> 0)
                ),
                EXCLUDEEMPTY
        ) = 0,
        [_ORG_AXIS_SET],
        {
        IIF(([orderedPosSet].Item(0).Item(0) = 0),
            { },
            Union(Subset([_ORG_AXIS_SET], 0,
[orderedPosSet].Item(0).Item(0)),
                    {[orderedPosSet].Item(0).Item(1)}),
        IIF(([orderedPosSet].Item(1).Item(0) = 0),
            { },
            Union(Subset([_ORG_AXIS_SET],
[orderedPosSet].Item(0).Item(0),
([orderedPosSet].Item(1).Item(0) –
[orderedPosSet].Item(0).Item(0))),
                    {[orderedPosSet].Item(1).Item(1)}),
        IIF(([orderedPosSet].Item(2).Item(0) = 0),
            { },
            Union(Subset([_ORG_AXIS_SET],
[orderedPosSet].Item(1).Item(0),
([orderedPosSet].Item(2).Item(0) –
[orderedPosSet].Item(1).Item(0))),
                    {[orderedPosSet].Item(2).Item(1)}),
            Subset([_ORG_AXIS_SET],
        Tail([orderedPosSet]).item(0).item(0))
        }
        )
    ...
```

If the query contains parentless calculations, then the resulting set, which may look like {C1, C2, C3}, is generated in steps 9 and 12 are unified with the above set to form the final result set 403 in step 13 in FIG. 5C. Otherwise, the above set is returned as the final result set 403.

The preceding figures and accompanying description illustrate example processes and computer implementable techniques. But computing environment in FIG. 2 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, each network environment may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art.

What is claimed is:

1. A computer-implemented method for positioning user-created data in an Online Analytical Processing (OLAP) database, the method comprising:
    receiving, at a server and from a client computing device, a query specifying one or more anchor members in a first hierarchy of the database and one or more user-created members to be positioned in the first hierarchy in relation to the anchor members according to a user-specified order, the first hierarchy of the database including members arranged in positions specified by the server;
    positioning, by the server, the user-created members in the first hierarchy of the database in relation to the anchor members according to the user-specified order, wherein the positioning comprises:
        determining a rank position for each of the anchor members;
        creating, for each of the user-created members to be positioned in the first hierarchy, an auxiliary calculated member on an ancillary hierarchy different than the first hierarchy, the auxiliary calculated member indicating the respective user-created member and the rank position of the associated anchor member;
        generating one or more query expressions in a query language of the database, the expressions specifying the anchor members and the one or more auxiliary calculated members; and
        executing the query expressions; and
    outputting, by the server to the client device, the first hierarchy of the database including the user-created members according to the user-specified order.

2. The method of claim 1, wherein each user-created member is a data structure that contains information about at least one of: a definition for the user-defined member as an OLAP language expression, an identifier for the user-created member, an identifier for the anchor member, or an identifier for a parent of each user-created member.

3. The method of claim 1, wherein the anchor member is a native member of the first hierarchy or another user-created member, on the first hierarchy, included in the query.

4. The method of claim 1, further comprising:
    determining, at the server, the ancillary hierarchy in a pre-processing operation after the receiving of the query from the client computing device, wherein the ancillary hierarchy is mathematically orthogonal to the first hierarchy.

5. The method of claim 1, wherein the one or more user-created members are positioned after their associated anchor member and not before their associated anchor member.

6. The method of claim 1, wherein the query expressions include sorting the auxiliary calculated members according to the ranks of the anchor members.

7. The method of claim 1, wherein the positioning of the user-created members does not require prescience of the state of the anchor member within the result of the query before execution of query expressions.

8. The method of claim 1, wherein the positioning further comprises:

positioning the user-created members that are anchored to the same anchor member in the same order that they appear in the query.

9. The method of claim 1, wherein the user-specified order specifies for each user-created member, before or after which other member the user-created member is to be positioned, wherein the user-specified order differs from positions that would have been specified by the server absent the user-specified order.

10. The method of claim 1, wherein the query further specifying one or more query expressions for each hierarchy on each axes of the query with the one or more anchor members in the first hierarchy of the database, the first hierarchy being placed on one of the query axes.

11. A computer program product encoded on a non-transitory storage medium, the product comprising computer readable instructions for causing one or more computers to perform operations for positioning user-created data in an Online Analytical Processing (OLAP) database, the operations comprising:
   receiving, at a server and from a client computing device, a query specifying one or more anchor members in a first hierarchy of the database and one or more user-created members to be positioned in the first hierarchy in relation to the anchor members according to a user-specified order, the first hierarchy of the database including members arranged in positions specified by the server;
   positioning, by the server, the user-created members in the first hierarchy of the database in relation to the anchor members according to the user-specified order, wherein the positioning comprises:
      determining a rank position for each of the anchor members;
      creating, for each of the user-created members to be positioned in the first hierarchy, an auxiliary calculated member on an ancillary hierarchy different than the first hierarchy, the auxiliary calculated member indicating the respective user-created member and the rank position of the associated anchor member;
      generating one or more query expressions in a query language of the database, the expressions specifying the anchor members and the one or more auxiliary calculated members; and
      executing the query expressions; and
   outputting, by the server to the client device, the first hierarchy of the database including the user-created members according to the user-specified order.

12. The computer program product of claim 11, wherein each user-created member is a data structure that contains information about at least one of: a definition of the user-defined members as one or more OLAP language expressions, an identifier for the user-created members, an identifier for the anchor member, or an identifier for a parent of each user-created member.

13. The computer program product of claim 11, further comprising:
   determining, at the server, the ancillary hierarchy in a pre-processing operation after the receiving of the query from the client computing device, wherein the ancillary hierarchy is mathematically orthogonal to the first hierarchy.

14. The computer program product of claim 11, wherein the one or more user-created members are positioned after their associated anchor member and not before their associated anchor member.

15. The computer program product of claim 11, wherein the query expressions include sorting the auxiliary calculated members according to the ranks of the anchor members.

16. The computer program product of claim 11, wherein the auxiliary calculated member takes into account cases where the anchor member is not present in the query result set.

17. The computer program product of claim 11, wherein the user-specified order specifies for each user-created member, before or after which other member the user-created member is to be positioned, wherein the user-specified order differs from positions that would have been specified by the server absent the user-specified order.

18. A system for positioning user-created data in an Online Analytical Processing (OLAP) database, the system comprising:
   an OLAP database;
   an OLAP server;
   a client device configured to receive a query specifying one or more anchor members in a first hierarchy of the database and one or more user-created members to be positioned in the first hierarchy in relation to the anchor members according to a user-specified order, the first hierarchy of the database including members arranged in positions specified by the server;
   the OLAP server including one or more processors, the one or more processors configured to:
      position the user-created members in the first hierarchy of the database in relation to the anchor members according to the user-specified order, wherein the positioning comprises:
         determining a rank position for each of the anchor members;
         creating, for each of the user-created members to be positioned in the first hierarchy, an auxiliary calculated member on an ancillary hierarchy different than the first hierarchy, the auxiliary calculated member indicating the respective user-created member and the rank position of the associated anchor member;
         generating one or more query expressions in a query language of the database, the expressions specifying the anchor members and the one or more auxiliary calculated members; and
         executing the query expressions; and
   the client device configured to output the first hierarchy of the database including the user-created members according to the user-specified order.

19. The system of claim 18, wherein the user-specified order specifies for each user-created member, to the before or after of which other member the user-created member is to be positioned, wherein the user-specified order differs from positions that would have been specified by the server absent the user-specified order.

20. A system for positioning user-created data in an Online Analytical Processing (OLAP) database, the system comprising:
   an OLAP database;
   an OLAP server;
   a client device configured to receive a query specifying one or more anchor members in a first hierarchy of the database and one or more user-created members to be positioned in the first hierarchy in relation to the anchor members according to a user-specified order, the first hierarchy of the database including members arranged in positions specified by the server;

the OLAP server including one or more processors, the one or more processors configured to:
position the user-created members in the first hierarchy of the database in relation to the anchor members according to the user-specified order, wherein the positioning comprises:
determining a rank position for each of the anchor members;
determining an ancillary hierarchy that is mathematically orthogonal to the first hierarchy;
creating, for each of the user-created members, an auxiliary calculated member on the ancillary hierarchy, the auxiliary calculated member indicating the respective user-created member and the rank position of the associated anchor member;
generating one or more query expressions in a query language of the database, the expressions specifying the anchor members and the one or more auxiliary calculated members, wherein the expressions cause sorting the auxiliary calculated members according to the ranks of the anchor members; and
executing the query expressions; and
the client device configured to output the first hierarchy of the database including the user-created members according to the user-specified order.

* * * * *